US012785477B2

(12) United States Patent
Liu et al.

(10) Patent No.: US 12,785,477 B2
(45) Date of Patent: Nov. 3, 2026

(54) VIBRATION MOTOR WITH VIBRATION IN THE DIRECTION OF Z-AXIS

(71) Applicant: TOPRAY MEMS INC., Hsinchu City (TW)

(72) Inventors: Chin-Sung Liu, Hsinchu City (TW); Chi-Ling Chang, Hsinchu City (TW); Hsiao-Ming Chien, Hsinchu City (TW)

(73) Assignee: TOPRAY MEMS INC., Hsinchu City (TW)

( * ) Notice: Subject to any disclaimer, the term of this patent is extended or adjusted under 35 U.S.C. 154(b) by 135 days.

(21) Appl. No.: 18/981,807

(22) Filed: Dec. 16, 2024

(65) Prior Publication Data

US 2026/0128632 A1 May 7, 2026

(30) Foreign Application Priority Data

Nov. 4, 2024 (TW) ................................. 113142201

(51) Int. Cl.
*H02K 1/34* (2006.01)
*H02K 1/12* (2006.01)
*H02K 33/02* (2006.01)

(52) U.S. Cl.
CPC ................. *H02K 1/34* (2013.01); *H02K 1/12* (2013.01); *H02K 33/02* (2013.01)

(58) Field of Classification Search
CPC ............ H02K 1/34; H02K 1/12; H02K 33/02; H02K 33/16
USPC ............................................................ 310/36
See application file for complete search history.

(56) References Cited

U.S. PATENT DOCUMENTS 5,602,432 A * 2/1997 Mizutani ................ H02K 33/16 310/15
5,945,749 A * 8/1999 Li ........................ H02K 7/1884 310/15
2004/0150277 A1* 8/2004 Moriyasu ............... H02K 33/18 310/15
2026/0128632 A1* 5/2026 Liu .......................... H02K 1/34

* cited by examiner

*Primary Examiner* — Ahmed Elnakib

(57) ABSTRACT

A vibration motor with vibration in the direction of Z-axis is provided, including a mover carrier and a stator part; wherein, the mover carrier includes a suspension spring and a coil set, the stator part includes a stator part body and a flexible printed circuit board. The suspension spring is arranged on two opposite sides of the mover carrier, with one end connected to the mover carrier and the other end to the stator part. The coil set includes a coil, wound around the vibration axis, and a magnetically conductive member located at the center of the coil. The two opposite sides of the stator part are connected to suspension spring to form an air gap between the stator part and the mover carrier. The stator part body accommodates the mover carrier. The flexible printed circuit board is arranged on the stator body and electrically connected to the coil set.

5 Claims, 6 Drawing Sheets

VIBRATION MOTOR WITH VIBRATION IN THE DIRECTION OF Z-AXIS

CROSS-REFERENCE TO RELATED APPLICATION

This application claims the priority of Taiwanese patent application No. 113142201, filed on Nov. 4, 2024, which is incorporated herewith by reference.

BACKGROUND OF THE INVENTION

1. Field of the Invention

The present invention relates generally to the field of vibration motors, and more particularly, to Z-axis vibration motors without magnet set.

2. The Prior Arts

With the development of touch devices, touch devices gradually replace traditional buttons on portable devices, allowing the portable device to have more space for the screen and thus increase the screen-to-body ratio. However, after the buttons were completely replaced, the shortcoming of the screen that could not provide tactile feedback gradually surfaced. In order to enhance user experience, portable device manufacturers have begun to study how to use vibration motors to provide users with touch feedback on touch devices.

Traditional vibration motors can be mainly divided into two categories: rotor motors and linear motors. Rotor motors generate vibrations by rotating asymmetric cams; linear motors generate vibrations by moving the mover back and forth in a specific direction. Since a linear motor does not need to rotate, it means there is no start-up delay. The linear motor is based on a magnet set to provide an environmental magnetic field, a coil, and an air gap between the coil and the magnetic pole to allow the mover to move relatively.

However, most touch devices are in the shape of a thin flat plate. When the moving direction of the mover is parallel to the X-axis or Y-axis vibration motor of the device screen, the mover can have sufficient space for the actuation stroke; and the magnet set can be set parallel to actuation direction of the actuator. The Z-axis vibration motor whose movement direction is normal to the screen will have its stroke limited due to the thin device. At the same time, the structure of the magnet set arranged in the direction of the actuator's movement will further compress the stroke space.

In view of the shortcomings of the conventional Z-axis vibration motor, such as, the limited movement space for the mover, and the magnet set compressing the movement space of the mover, the present invention is devised to address the aforementioned issues.

SUMMARY OF THE INVENTION

A primary objective of the present invention is to increase the operating stroke by replacing the conventional magnet set with the stator body and the coil set made of magnetically conductive materials to attract each other.

The vibration motor with vibration in the direction of Z-axis of the present invention includes: a mover carrier, made of magnetically conductive material, and further comprising: a suspension spring, in the shape of a long piece and arranged on opposite sides of the mover carrier, with one end connected to the mover carrier and the other end connected to a stator part; and a coil set, arranged on the mover carrier, and having a coil and a magnetic conductive member, the coil being wound around a central axis, and the magnetic conductive member being located at the center around which the coil being wound.

The opposite sides of the stator part are connected with suspension elastic pieces to form an air gap between the stator part and the mover carrier; the stator part further comprises a stator part body, box-shaped to accommodate the mover carrier, and made of magnetically conductive material; and a flexible circuit board, provided on the stator body to supply a driving voltage to the coil set.

In a preferred embodiment, the driving voltage has a driving frequency for driving the coil set to generate a time-varying magnetic field. The axial direction of the magnetic force of this time-varying magnetic field is parallel to the vibration direction. The intensity of the time-varying magnetic field varies periodically over time, and the frequency of this variation corresponds to the driving frequency. Consequently, the time-varying magnetic field generates a periodically varying magnetic force between the stator body and the mover carrier, thereby driving the mover carrier to reciprocate to produce the vibration.

In a preferred embodiment, the suspension spring is in the shape of a long piece and is bent in the direction of the stator part; the suspension spring comprises a connecting part, a bent part, and a free end, wherein the connecting part is the one end of the suspension spring connected to the mover carrier; the free end is located at the other end of the suspension spring opposite to the connecting part; and the bent part is located between the connecting part and the free end.

Furthermore, the bending part enables the suspension spring to form an upper elastic piece and a lower elastic piece, and the free end needs to be welded and fixed with the connecting part so that the upper elastic piece and the lower elastic piece of the suspension spring are parallel to each other; the upper elastic piece is located between the connecting part and the bent part, the lower elastic piece is located between the bent part and the free end, and the lower elastic piece is closer to the stator body than the upper elastic piece.

In a preferred embodiment, the connecting part of the upper elastic piece connects the two opposite sides of the mover carrier in opposite directions.

In a preferred embodiment of the present invention, the bent part, the upper elastic piece, and the lower elastic piece together form a fitting space, the suspension spring further comprises a fixed block, to be placed in the fitting space; after the fixed block is placed in the fitting space, the upper elastic piece and the lower elastic piece are welded to be fixed to the fixed block respectively, and the side away from the mover carrier is the fitting surface.

In a preferred embodiment, when the mover carrier is installed into the stator body, the fitting surface contacts inner side walls of the stator body on two opposite sides corresponding suspension spring; the mover carrier and the stator part are fixed by welding and assembling the fitting surface and the wall surface.

In a preferred embodiment, the mover carrier and the suspension spring are integrally formed.

In a preferred embodiment, the vibration frequency of the mover carrier is twice the driving frequency.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
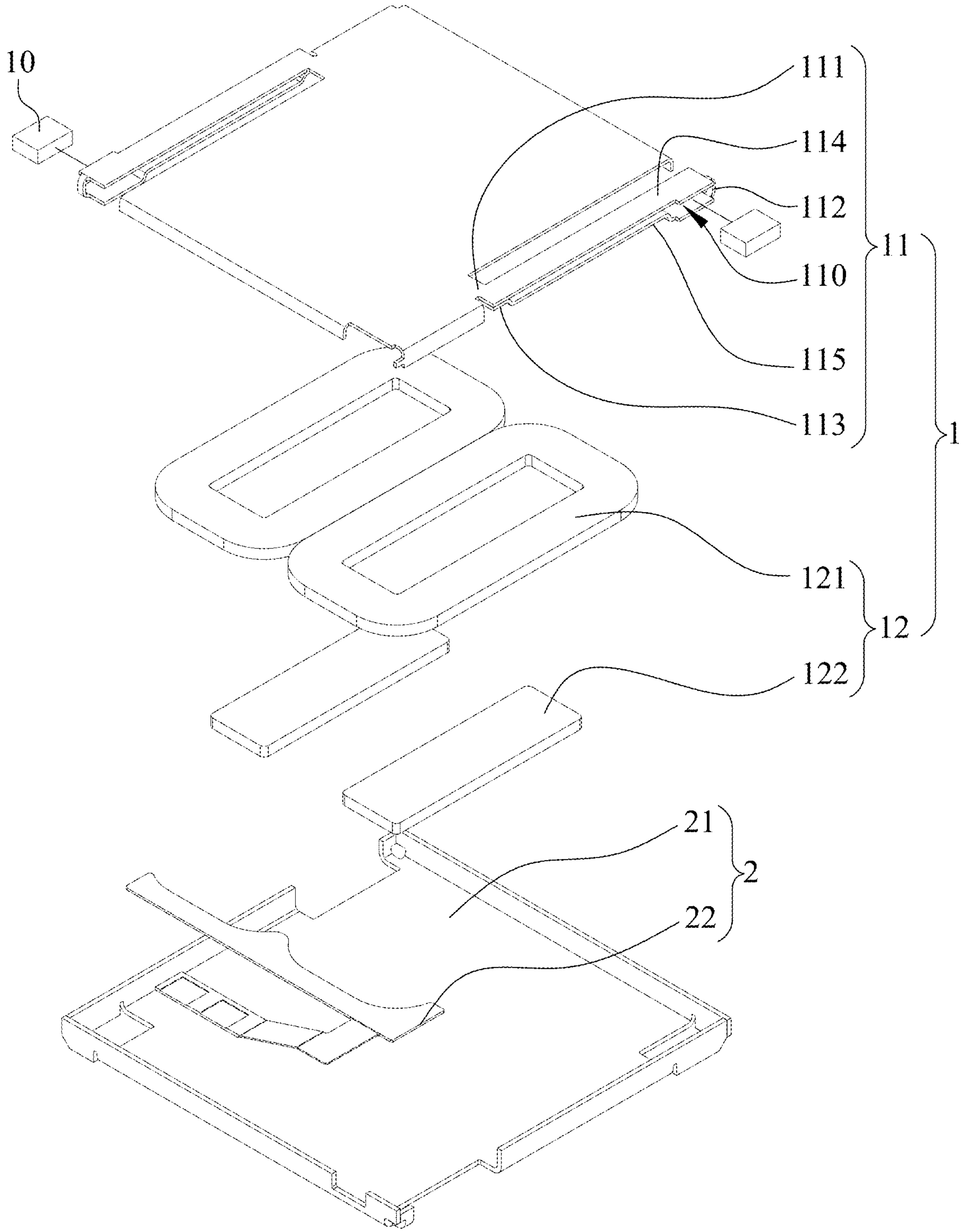
FIG. 1 is an exploded perspective view of an embodiment of the present invention.
Figure 2:
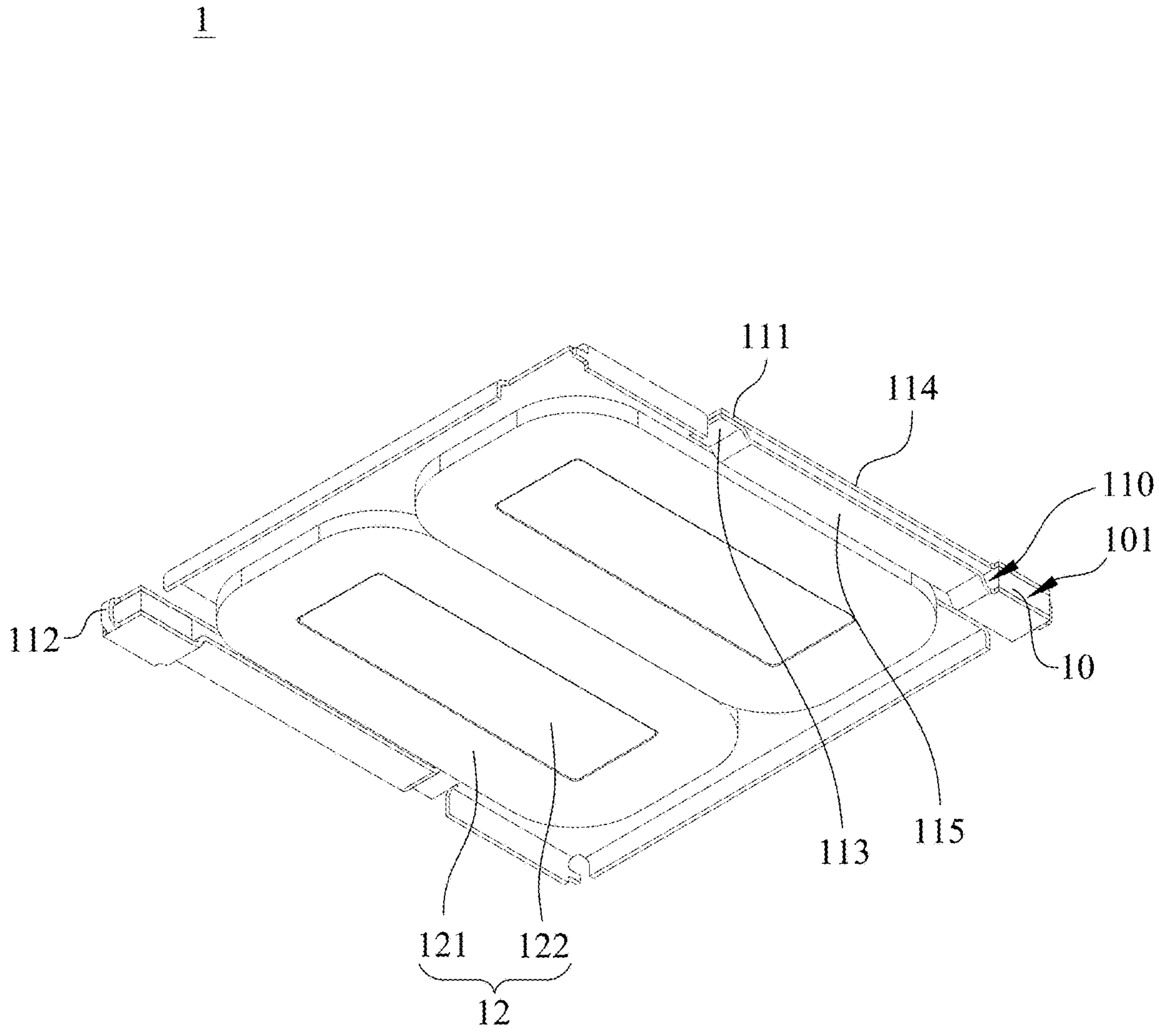
FIG. 2 is a perspective bottom view of the mover carrier according to the embodiment of the present invention.

FIGS. 1 to 6 are schematic view of an embodiment of the present invention. As shown in FIG. 1, an exploded perspective view of the embodiment of the present invention, the vibration motor with vibration in the direction of Z-axis according to the present invention includes: a mover carrier 1 and a stator part 2. FIG. 1 and FIG. 2 show the perspective bottom view of the mover carrier 1 according to the embodiment of the present invention. The mover carrier 1 has: a suspension spring 11 and a coil set 12; and the stator part 2 has: a stator part body 21 and a flexible printed circuit board 22. The suspension spring 11 is a long piece and is arranged on two opposite sides of the mover carrier 1, and one end of the suspension spring 11 is connected to the mover carrier 1 and the other end is connected to the stator part 2; and the coil set 12 is arranged on the mover carrier 1 and further includes a coil 121 and a magnetic conductive member 122. The coil 121 is wound with the vibration axis as the central axis, and the magnetic conductive member 122 is located at a center area around which the coil 121 is wound.

Figure 3:
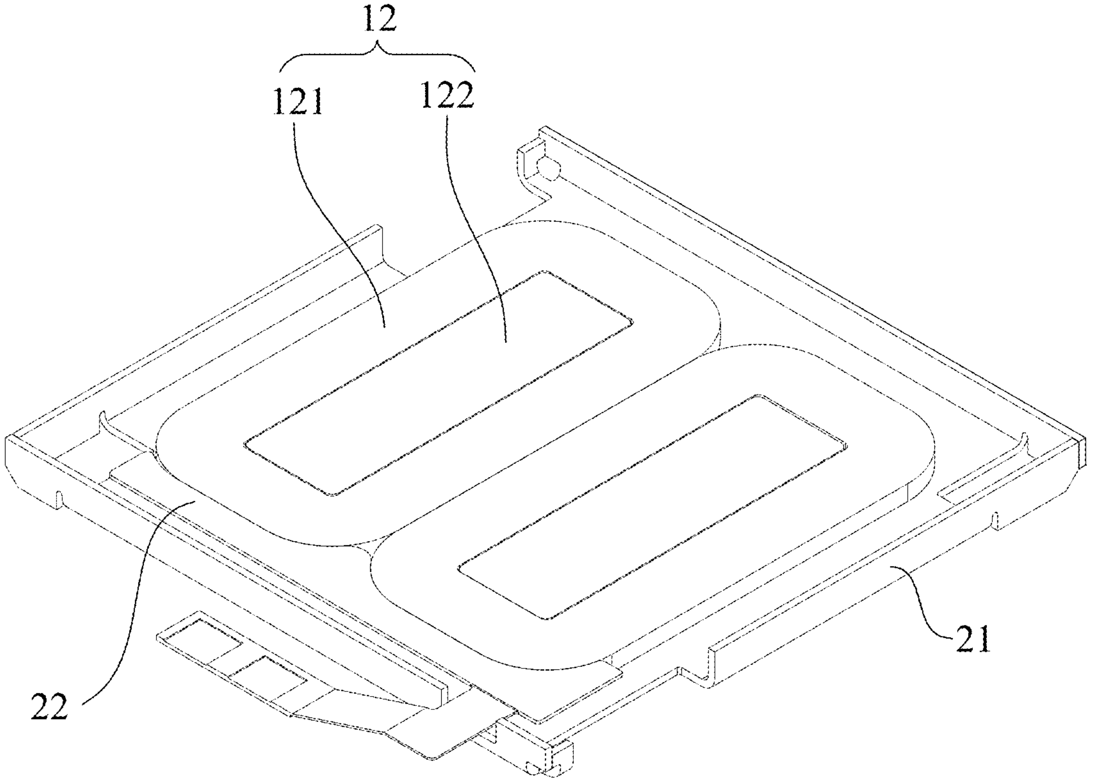
FIG. 3 is a schematic top view of the stator part and coil according to the embodiment of the present invention.
Figure 4:
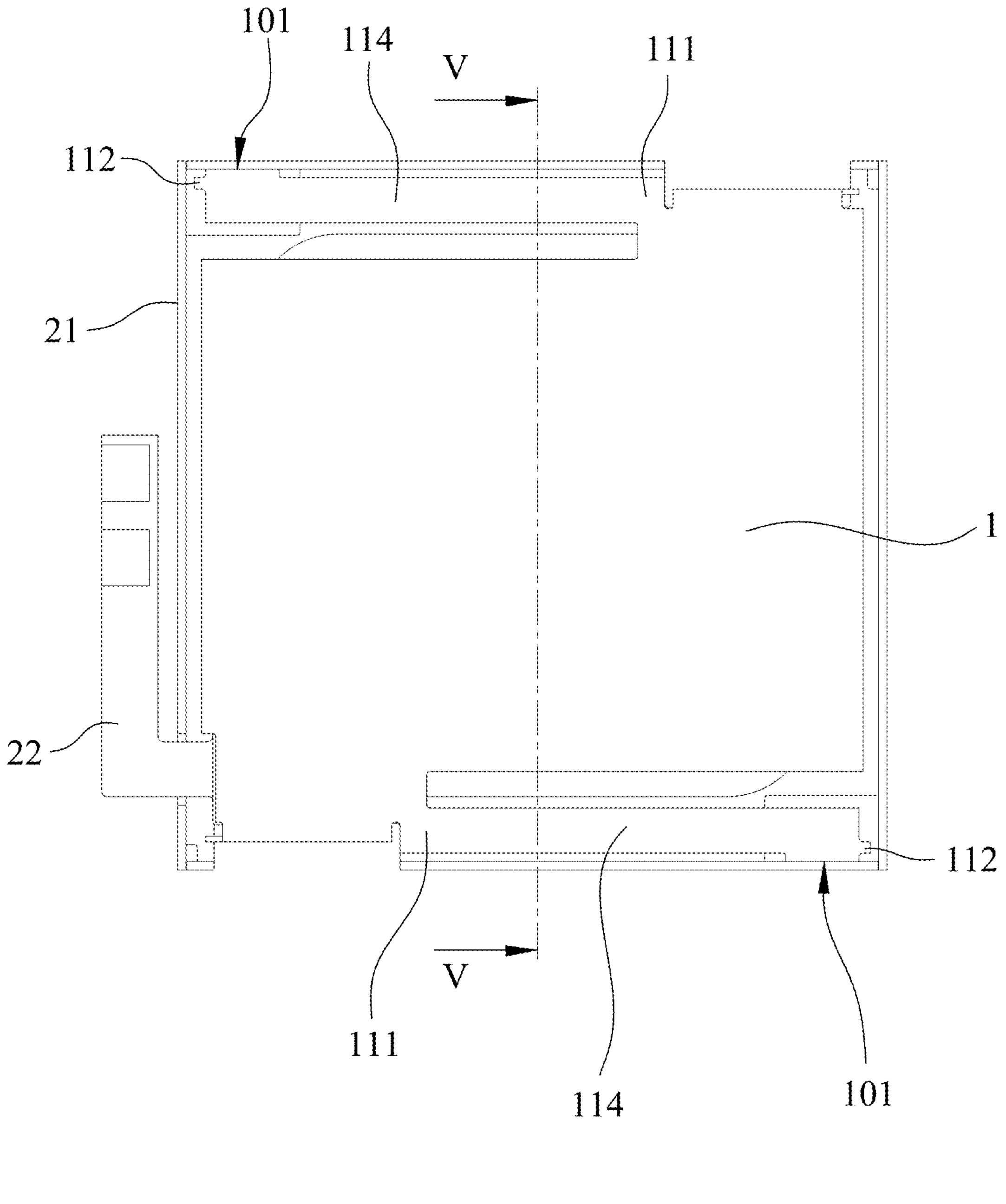
FIG. 4 is a top view of an embodiment of the present invention.
Figure 5:
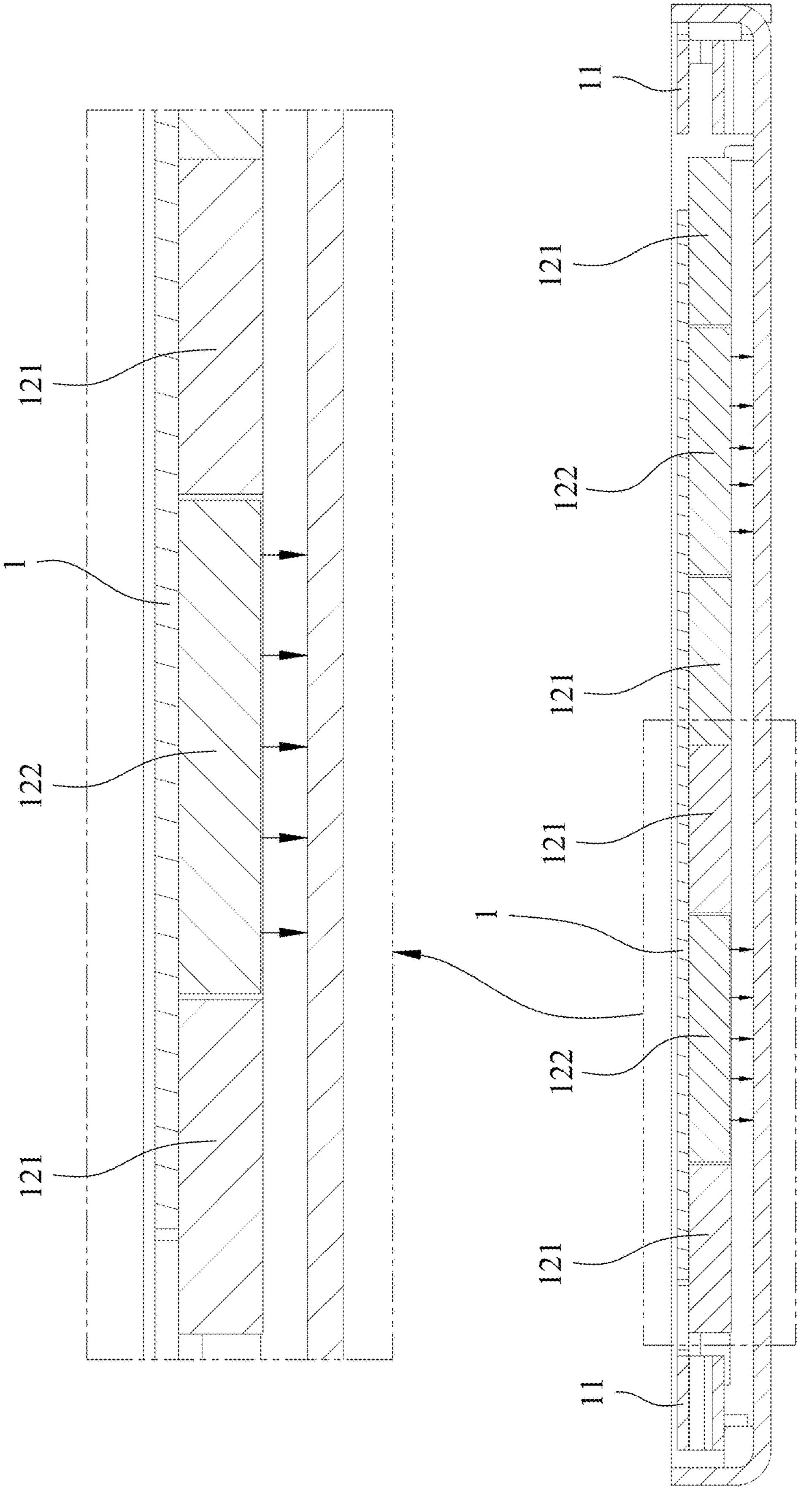
FIG. 5 is a cross-sectional view of the application of the embodiment of the present invention along the V-V direction of FIG. 4.

As shown in the top view of the stator part 2 and the coil set 12 of the embodiment of the present invention in FIG. 3 and the top view of the embodiment of the present invention in FIG. 4, the two opposite sides of the stator part 2 are connected with suspension spring 11 and an air gap is formed between the stator part 2 and the mover carrier 1. Both the stator part 2 and the mover carrier 1 are made of magnetically conductive materials. The stator part body 21 is box-shaped and can accommodate the mover carrier 1. The flexible printed circuit board 22 is disposed on the stator body 21 and is electrically connected to the coil set 12 for supplying driving voltage to the coil set 12.

Specifically, the driving voltage has a driving frequency for driving the coil set 12 to generate a time-varying magnetic field. The axial direction of the magnetic force of this time-varying magnetic field is parallel to the vibration direction. The intensity of the time-varying magnetic field varies periodically over time, and the frequency of this variation corresponds to the driving frequency. As shown in the cross-sectional view of the embodiment of the present invention in the V-V direction of FIG. 5 and FIG. 4, the coil set 12 becomes an electromagnet to attract the stator body 21. In cooperation with the suspension spring 11, the time-varying magnetic force generated between the stator body 21 and the mover carrier 1 drives the mover carrier 1 to reciprocate to produce the vibration.

Figure 6:
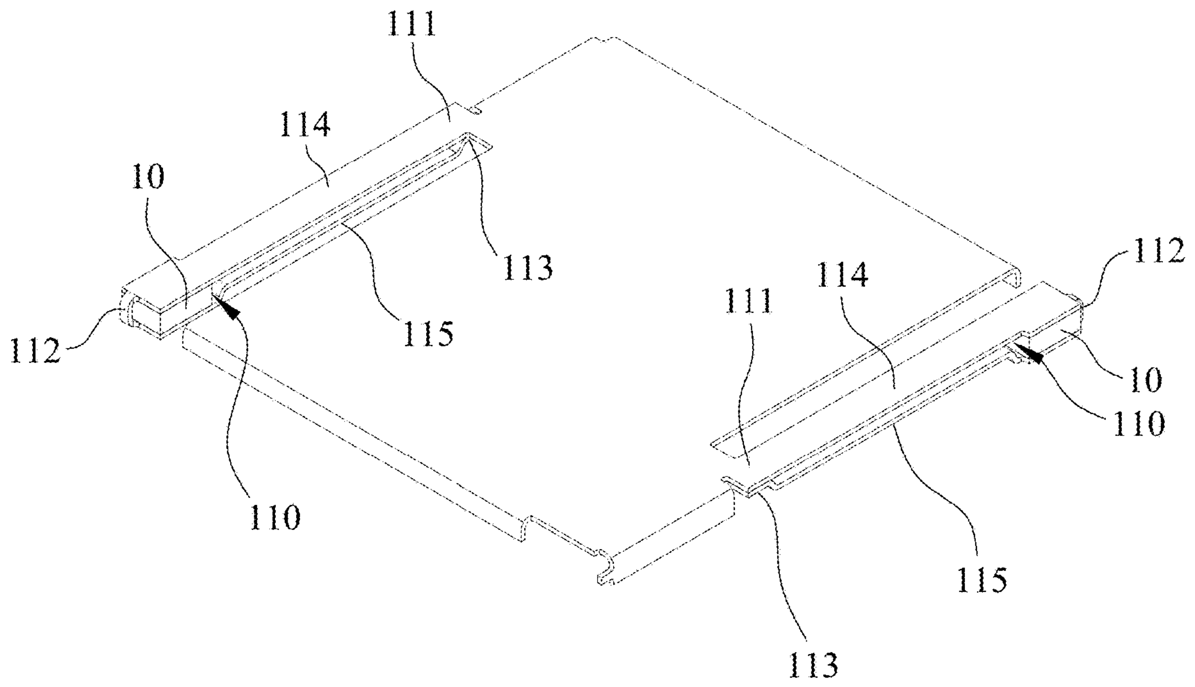
FIG. 6 is a top perspective view of the mover carrier according to the embodiment of the present invention.

As shown in FIG. 6, which is a top perspective view of the mover carrier 1 according to the embodiment of the present invention, the suspension spring 11 is in the shape of a long piece and is bent toward the stator part 2. The suspension spring 11 includes a connecting part 111, a bent part 112 and a free end 113, wherein the connecting part 111 is the end of the suspension spring 11 connected to the mover carrier 1; the free end 113 is located at the other end of the suspension spring 11 opposite to the connecting part 111; and the bent part 112 is located in the middle section of the suspension spring 11.

Furthermore, the bent part 112 enables the suspension spring 11 to form an upper elastic piece 114 and a lower elastic piece 115. The upper elastic piece 114 is located between the connecting part 111 and the bent part 112, the lower elastic piece 115 is located between the bent part 112 and the free end 113, and the lower elastic piece 115 is closer to the stator body 21 than the upper elastic piece 114. The free end 113 needs to be welded and fixed to the connecting part 111 so that the upper elastic piece 114 and the lower elastic piece 115 of the suspension spring 11 are parallel to each other.

Specifically, by bending the suspension spring 11 to form an upper elastic piece 114 and a lower elastic piece 115, the air gap distance between the mover carrier 1 and the stator part 2 can be increased. At the same time, the bent structure of the suspension spring 11 can also increase the elastic deformation range of the mover carrier 1, and enable the mover carrier 1 to vibrate in the vibration axis direction.

In a preferred application, as shown in FIG. 4, the connecting part 111 of the suspension spring 11 connects the two opposite sides of the mover carrier 1 in opposite directions.

Specifically, the suspension springs 11 are connected to the opposite sides of the mover carrier 1, providing a mechanism for the mover carrier 1 to move parallel in the vibration direction, so that the mover carrier 1 will not vibrate in deviation to one side causes elastic fatigue of the suspension spring 11 during the vibration process.

As shown in FIGS. 2 and 6, the bent part 112, the upper elastic piece 114, and the lower elastic piece 115 together form a fitting space 110. The suspension spring 11 also has a fixed block 10, which can be placed in the fitting space 110. After the fixed block 10 is placed into the fitting space 110, the upper elastic piece 114 and the lower elastic piece 115 are welded and fixed to the fixed block 10 respectively, and the side of the fixed block 10 away from the mover carrier 1 is defined as the fitting surface 101.

As shown in FIG. 4, when the mover carrier 1 is installed into the stator body 21, the fitting surface 101 and the inner wall surfaces of the stator body 21 corresponding to the two opposite sides of the suspension spring 11 are in contact with each other.

Specifically, when assembling the vibration motor with vibration in the direction of Z-axis according to the present invention, the fitting surface 101 and the wall surface can be welded and assembled to fix the mover carrier 1 and the stator part 2. No other additional welding is required.

Preferably, the mover carrier 1 and the suspension spring 11 are integrally formed in one piece.

In a preferred embodiment, whether it is a positive voltage or a negative voltage, the coil group 12 generates magnetic attraction to the stator part 2. Therefore, when the driving frequency is a continuous sine wave, the vibration frequency of the mover carrier 1 is twice the driving frequency.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A vibration motor, comprising:

a mover carrier, made of magnetically conductive material, and further comprising:

a suspension spring, being an elongated piece and arranged on opposite sides of the mover carrier, with one end connected to the mover carrier and the other end connected to a stator part; and a coil set, arranged on the mover carrier, and having a coil and a magnetic conductive member, the coil being wound around a central axis, and the magnetic conductive member being located at a center area around which the coil being wound; and the stator part, having two opposite sides connected with suspension elastic pieces to form an air gap between the stator part and the mover carrier, and further comprising:

a stator body, being box-shaped to accommodate the mover carrier, and made of magnetically conductive material; and a flexible circuit board, provided on the stator body to supply a driving voltage to the coil set.

2. The vibration motor according to claim 1, wherein the suspension spring comprises:

a connecting part, being the one end of the suspension spring connected to the mover carrier;

a free end, located at the other end of the suspension spring opposite to the connecting part; and a bent part, located between the connecting part and the free end;

wherein the bent part enables the suspension spring to form an upper elastic piece and a lower elastic piece, the upper elastic piece is located between the connecting part and the bent part, the lower elastic piece is located between the bent part and the free end, the lower elastic piece is closer to the stator body than the upper elastic piece, and the free end and the connecting part are connected and fixed to each other;

wherein the connecting part of the suspension spring connects the two opposite sides of the mover carrier in opposite directions.

3. The vibration motor according to claim 2, wherein the bent part, the upper elastic piece, and the lower elastic piece together form a fitting space, a fixed block is placed in the fitting space; and after the fixed block is placed in the fitting space, the upper elastic piece and the lower elastic piece are welded to be fixed to the fixed block respectively.

4. The vibration motor according to claim 3, wherein a side of the fixed block away from the mover carrier is a fitting surface, the fitting surface is in contact with inner side walls of two opposite sides on the stator body corresponding to the suspension spring, and the mover carrier and the stator part are fixedly connected by welding and assembly.

5. The vibration motor according to claim 4, wherein the mover carrier and the suspension spring are integrally formed.

* * * * *